United States Patent
Lau et al.

[11] Patent Number: 6,049,377
[45] Date of Patent: Apr. 11, 2000

[54] FIVE-AXIS/SIX-AXIS LASER MEASURING SYSTEM

[75] Inventors: Kam C. Lau, Gaithersburg; Yuan-Qen Liu, Greenbelt, both of Md.

[73] Assignee: Cam C. Lau, Gaithersburg, Md.

[21] Appl. No.: 08/911,915

[22] Filed: Aug. 15, 1997

Related U.S. Application Data

[60] Provisional application No. 60/024,082, Aug. 16, 1996.

[51] Int. Cl.[7] .................................................. G01N 21/64
[52] U.S. Cl. ........................................ 356/73; 356/351
[58] Field of Search ................... 372/27, 106; 356/367, 356/365, 141.2, 358, 363, 73, 364, 369, 351, 356; 369/50; 250/216, 225

[56] References Cited

U.S. PATENT DOCUMENTS

| | | | |
|---|---|---|---|
| 3,915,572 | 10/1975 | Orloff | 356/106 R |
| 4,560,272 | 12/1985 | Harris | 356/138 |
| 4,714,339 | 12/1987 | Lau et al. | 356/358 |
| 4,804,270 | 2/1989 | Miller et al. | 356/355 |
| 4,849,954 | 7/1989 | Yamaguchi | 369/50 |
| 5,056,921 | 10/1991 | Chaney | 356/351 |
| 5,064,289 | 11/1991 | Bockman | 356/351 |
| 5,073,025 | 12/1991 | Brooks | 356/367 |
| 5,102,222 | 4/1992 | Berger et al. | 356/367 |
| 5,363,196 | 11/1994 | Cameron | 356/358 |
| 5,404,365 | 4/1995 | Hiiro | 372/106 |
| 5,418,611 | 5/1995 | Huang et al. | 356/141.3 |

*Primary Examiner*—Frank G. Font
*Assistant Examiner*—Tu T. Nguyen
*Attorney, Agent, or Firm*—Nixon Peabody, LLP; Donald R. Studebaker; Thomas M. Blasey

[57] ABSTRACT

A 6-axis laser measurement system includes a novel 5-D measurement apparatus and a precision laser roll detector. The 5-D system measures pitch, yaw, X, Y, and Z displacements with a single setup of a laser head and detection housing. The laser roll detector uses a polarizing prism, such as a Glan-Thompson prism, and at least two photodetectors. A linearly polarized laser beam enters the prism, and the beam is split into two polarized components, the intensities of which vary with roll orientation of the detector relative to the polarized laser beam. The outputs of the two photodetectors are connected to the positive and negative inputs, respectively, of a high gain differential amplifier which provides a roll output.

24 Claims, 4 Drawing Sheets

FIVE-AXIS/SIX-AXIS LASER MEASURING SYSTEM

This application claims the benefit of U.S. Provisional Application No. 60/024,082 filed Aug. 16, 1996.

FIELD OF THE INVENTION

The present invention relates generally to precision measuring systems, and in particular, to six-axis position measuring systems incorporating an improved five-axis detection system and a precision laser roll detector.

BACKGROUND OF THE INVENTION

There is a need for precision measuring systems which can be used to accurately determine positioning of an object. These measuring systems are particularly useful in calibrating and certifying machine tools, and for monitoring and controlling robots in industrial applications.

Five-axis precision laser measuring systems have been developed, such as the inventor's 5-D laser tracking system disclosed in U.S. Pat. No. 4,714,339. This system detects positioning in five "dimensions": X, Y, and Z displacement, pitch, and yaw. Laser detection of roll orientation has posed a more difficult problem, since roll does not necessarily result in any change in distance between the observing position and portions of the rolling element.

U.S. Pat. No. 5,064,289 to Bockman discloses a laser interferometer system which detects roll using a laser and two photodetectors. Bockman, however, uses two separated beam paths and a mirror assembly to measure roll.

U.S. Pat. No. 5,056,921 to Chaney and U.S. Pat. No. 5,363,196 to Cameron are similar to the Bockman patent in that they show roll measuring systems that use separated beam paths to measure roll. U.S. Pat. No. 4,804,270 to Miller et al. uses a diffraction grating to provide multiple beam portions to detect roll.

U.S. Pat. No. 5,418,611 to Huang et al. discloses a pitch and yaw measurement device which uses a polarizing beam splitter, two critical angle prisms, and two photodiodes to detect angular changes. However, this device does not provide roll detection.

A system was developed at the University of Michigan which uses two off-center retroreflectors on a common sensor head, aligned with two off-center laser beams, to detect roll. This general technique is relative inaccurate, and thus impractical for precision machine tool applications.

The inventor's company has sponsored research in the field of laser roll detection in collaboration with the University of North Carolina-Charlotte. As a result of this research, a laser roll detector was developed which uses a modulated, polarized laser beam which is passed through a Faraday cell, then a Glan-Thompson prism, and then to an intensity photodetector. The beam is dithered with a modulation frequency (e.g. 17 hz), and the dither frequency is then used to filter the intensity output to provide an output substantially free from the effects of beam intensity variations.

U.S. Pat. No. 3,915,572 to Orloff shows a laser Doppler velocimeter where two photodetectors have outputs connected to a differential amplifier to cancel disturbances common to the measured light beams. However, there is no suggestion that this technique could be useful in a polarized laser beam for roll detection.

None of these previous developments has provided an entirely satisfactory precision laser roll detector, and there is a need for an improved precision laser roll detector which can be used alone or as a component of a multiple axis position detecting system. Further, none of these techniques has provided a completely satisfactory 5-D detection system.

SUMMARY OF THE INVENTION

Therefore, it is a general object of the invention to provide improved 5-axis and 6-axis precision laser measuring systems.

Another general object of the invention is to provide a precision laser roll detection system.

A more specific object of the invention is to provide a precision laser roll detection system that uses differential processing of the outputs of a plurality of photosensors to determine the roll orientation of an object.

Another object of the invention is to provide a laser roll detector that uses a single laser beam, a polarizing prism, and at least two photodetectors to determine roll orientation of an object.

A further object of the invention is to provide a laser roll detection system where a laser beam is linearly polarized and passed through a polarizing beamsplitting prism, which splits the beam into a plurality of polarized components, the intensities of which vary with roll orientation of the detector relative to the polarized laser beam.

Another object of the invention is to detect roll orientation of an object using a laser by differentially measuring polarized intensity components of the laser beam using a high gain differential amplifier.

An additional object of the invention is to provide an improved 5-axis and 6-axis precision laser measuring system employing a temperature stabilized laser.

These objects and others are achieved in the present invention by providing an improved 5-D laser measurement system which can measure pitch, yaw, and X, Y, and Z displacements simultaneously.

In a preferred embodiment, the 5-D system is combined with a precision laser roll detection apparatus to form a 6-D system. The laser roll detector uses a polarizing beamsplitting prism, such as a Glan-Thompson prism, and at least two photodetectors. A linearly polarized laser beam enters the prism, and the beam is split into two polarized components, the intensities of which vary with roll orientation of the detector relative to the polarized laser beam. The outputs of the two photodetectors are connected to the positive and negative inputs, respectively, of a high gain differential amplifier which provides a roll output.

DETAILED DESCRIPTION OF THE PREFERRED EMBODIMENTS

The present invention provides a measurement system comprising a novel five-axis laser measurement system and a novel roll sensor. The five-axis system and the roll sensor may be used separately, or used in combination to provide a six-axis system.

Figure 1:
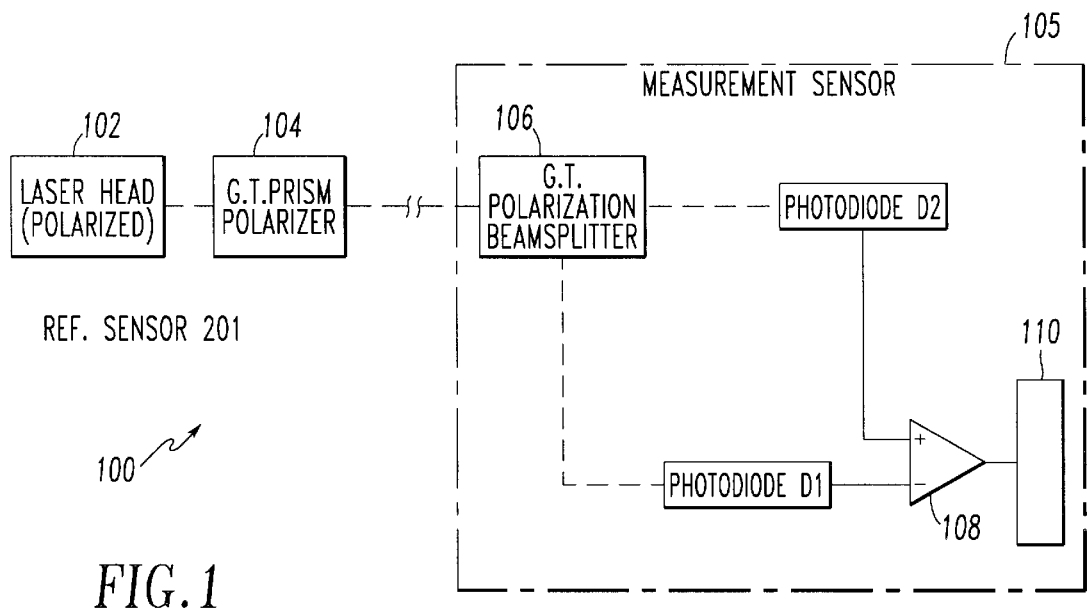
FIG. 1 is a block schematic diagram of a first embodiment of a laser roll detection system according to the invention.

The features of the roll sensor will now be described with reference to FIG. 1. In a first embodiment of the invention, a precision roll sensor 100 comprises laser 102, Glan-Thompson prism polarizer 104, and measurement sensor 105. Measurement sensor 105 includes Glan-Thompson polarization beamsplitter 106, photodiodes D1 and D2, differential amplifier 108, and computer 110.

Laser 102 preferably incorporates a microprocessor controlled intensity stabilizer to maintain a stable frequency output. An environmental compensator provides wavelength compensation.

Glan-Thompson prism polarizer 104 purifies the linear polarization of the beam output of laser 102. This linear polarization can be resolved into two orthogonal vector components, which will be referred to herein as horizontal and vertical, although it will be understood that the actual angular orientation of these two components may vary depending on the orientation and construction of prism polarizer 104.

The provision of Glan-Thompson prism polarizer 104 and Glan-Thompson polarization beamsplitter 106 in this embodiment results in a self-stabilizing beam system. When the laser beam hits polarizing beamsplitter 106, it is split into horizontally polarized and vertically polarized components as a result of the properties of beamsplitter 106. The horizontally polarized portion of the beam passes through beamsplitter 106 to photodiode D2 which generates an output signal corresponding to the intensity of the horizontally polarized portion of the beam. The vertically polarized portion of the beam is directed by beamsplitter 106 onto photodiode D1.

The intensity measurement outputs of photodiodes D1 and D2 are connected to the positive and negative inputs, respectively, of a high-gain differential amplifier 108, which provides an output representative of the roll between Glan-Thompson prism polarizer 104 and measurement sensor 105.

The beam is split into two differently polarized portions based on the exact roll orientation between polarizer 104 and measurement sensor 105. At a 45 degree roll orientation, photodiodes D1 and D2 will receive the same beam intensity. However, as the detector is rolled in either direction, one of the detectors will receive greater intensity than the other. The difference between these outputs is measured by differential amplifier 108 to provide an indication of roll. The subtraction operation of differential amplifier 108 also advantageously tends to compensate for background and extraneous noise, such as that produced by fluctuations in beam intensity and/or background light. Variations in beam output, as well as other signal noise that may be present, are measured by both photodiodes and are canceled out by the differential amplifier operation. This feature significantly enhances sensitivity and accuracy of the system.

The output of the laser roll detector is provided to computer 110 which is provided with software which records, analyzes, and makes appropriate compensations in the measured roll output.

Using computer 110, the system automatically corrects for nonlinearities in the roll measurement which have been identified by empirical use and through instrument calibration and validation procedures. As another example, the system may include a temperature compensation mechanism. The ambient temperature can be sensed and the measured roll can be corrected for variations caused by temperature, based on a computer temperature sensitivity model, generated from empirical measurements of the same roll of the same object at different temperatures.

Figure 2:
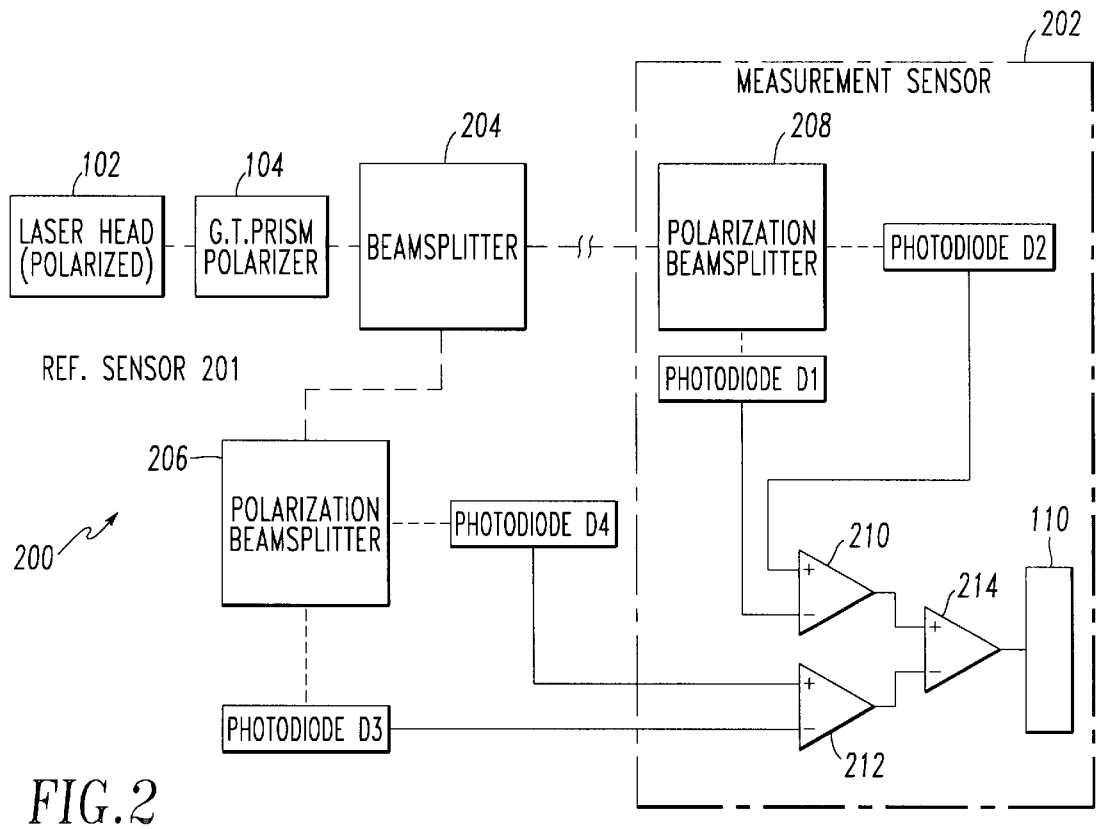
FIG. 2 is a block schematic diagram of a second embodiment of a laser roll detection system according to the invention.

FIG. 2 shows another embodiment of the laser roll detection portion of the invention. A polarized laser 102 and a Glan-Thompson prism polarizer 104 are provided to generate a pure linearly polarized laser beam. Preferably, the direction of polarization is oriented at 45 degrees to the horizontal, so that this polarization can be resolved into horizontal and vertical vector components.

In this embodiment, the stationary laser beam generation assembly is provided with a reference sensor 201 comprising beamsplitter 204, polarization beamsplitter 206, photodiodes D3 and D4, and differential amplifier 212. Differential amplifier 212 provides an output varying with the polarization of the beam as measured at prism polarizer 104.

Beamsplitter 204 splits the incoming polarized laser beam into two paths, directed toward reference sensor 201 and measurement sensor 202 respectively.

Measurement sensor 202 comprises polarization beamsplitter 208, photodiodes D1 and D2, and differential amplifier 210. Differential amplifier 210 provides an output indicative of roll of measurement sensor 202 relative to the position of prism polarizer 104, in the same general manner described above with reference to FIG. 1.

Essentially, polarization beamsplitters 206 and 208 transmit the horizontally polarized component of the beam to photodiodes D3 and D2, respectively, and direct the vertically polarized beam component to photodiodes D4 and D1, respectively. The outputs of photodiodes D3 and D4 are connected to the positive and negative inputs, respectively, of differential amplifier 212. The outputs of photodiodes D1 and D2 are connected to the positive and negative inputs, respectively, of differential amplifier 210.

The outputs of differential amplifiers 210 and 212 are connected to the positive and negative inputs, respectively, of differential amplifier 214, which provides a roll output signal to computer 110. The outputs of measurement sensor 202 and reference sensor 201 are differentially combined in differential amplifier 214 to produce a roll output signal that is compensated f reduces the effect of laser source error on the resulting roll measurement, as compared to the configuration of FIG. 1.

In this embodiment, a Glan-Thompson beamsplitting prism is not used. Polarization beamsplitters 206 and 208 are more conventional and less expensive polarizing beamsplitters, constructed by epoxying two 45 degree prisms together with a polarization-sensitive dielectric coating between them.

Glan-Thompson polarizers and beamsplitters are used in the embodiments discussed above because they provide a particularly accurate beam polarization and split of the polarized beam, which is desirable for producing an extremely accurate roll detection. The Glan-Thompson prism has a high extinction ratio to polarized light—typically on the order of $10^5$.

The sensor disclosed herein has a sensitivity of better than 0.2 arc-second over a 200 arc-second range, and sensitivities of better than 0.1 arc-second may be achieved using the techniques disclosed herein. However, because of the cost of the Glan-Thompson components, it may be desirable to replace the Glan-Thompson prism polarizer with a polarizing filter, depending on the accuracy required and whether that accuracy can be achieved through other compensating mechanisms.

Figure 3:
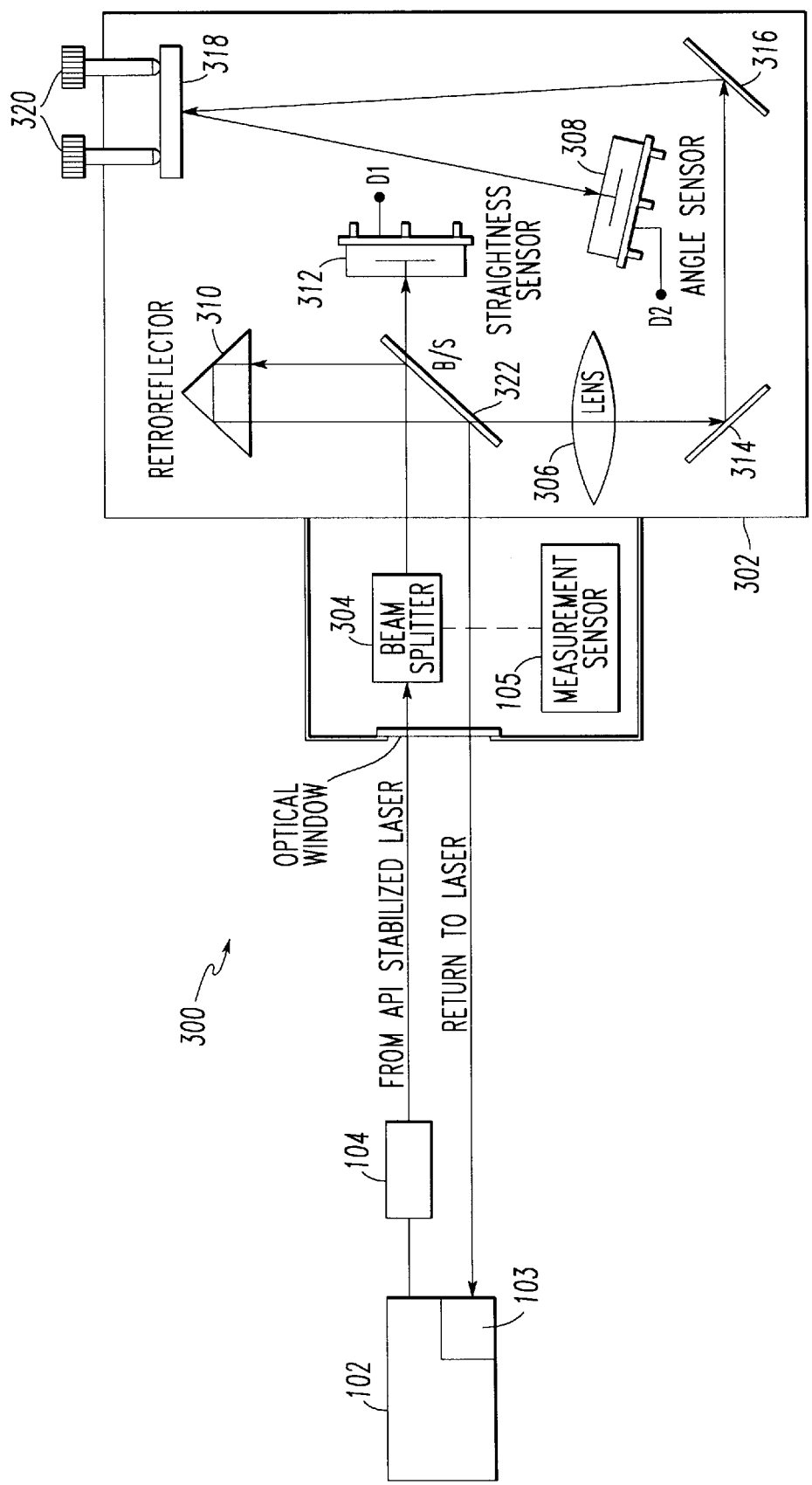
FIG. 3 is a block schematic diagram of a five-axis position detection system incorporating the roll detection system shown in FIGS. 1 or 2 to form a six-axis detection system.

Referring now to FIG. 3, the precision roll sensor as described herein is preferably combined with a novel five-axis measuring system which will now be described in detail. By combining the precision roll detector with a system capable of measuring X, Y, and Z displacements, pitch, and yaw, a system is provided that is capable of measuring six axes of movement, including X, Y, and Z displacements, pitch, yaw, and also roll. Alternatively, the novel five-axis system shown in FIG. 3 may be used independently in cases where no roll detection capability is desired.

The laser roll detector is preferably constructed as a cubical unit measuring about 3.8 cm on each side. In this manner, the laser roll detector can be easily integrated into the five-axis measuring sensor, requiring only a slight increase in casing size to accommodate the additional sensor. Referring to FIG. 3, a six-axis measuring system 300 constructed according to the invention comprises laser 102, polarizer 104, and sensor housing 302. Laser 102 includes a frequency stabilized laser interferometer 103 for measuring X-displacement. Housing 302 preferably measures 100 mm×75 mm×45 mm to accommodate a 5-D system, and is slightly larger for the 6-D system. In typical operation for analyzing performance of a machining system, housing 302 is mounted on the tool head of the machine tool and laser 102 and polarizer 104 are mounted on the machine table. The machine is then given movement commands and data on the resulting movement is produced by system 300 and recorded for analysis.

The operation and construction of the five-axis portion of the device will now be described in detail. Generally, as the laser beam enters housing 302, part of the beam energy is directed through beam splitter 322 to a dual axis lateral effect detector 312. Detector 312 is preferably a model SC10-D photodetector manufactured by United Detector Technology (UDT) Sensors, Inc. of Hawthorne, Calif. The outputs of detector 312 are measures of two lateral movements, or straightness errors ($\Delta Y$ and $\Delta Z$) of housing 302 with respect to the beam axis.

The remaining portion of the laser beam energy is directed into retroreflector 310 by beam splitter 322. Retroreflector 310 provides a beam reflection which is directed against another portion of beam splitter 322, and is partially diverted back to the laser location. The beam reflection produced by retroreflector 310 is interferometrically processed at the laser location by interferometer 103 to determine X-displacement. The interferometer 103 provided at the laser transmission location include four PIN photodiodes and a circuit for generating a conventional A-quad-B interferometer output, such as a model 501A optical phase decoder manufactured by CMX Systems, Inc. The output of interferometer 103 is processed by computer 110 to count passage of interferometrically produced fringes as the distance between the laser and housing 302 changes, and to measure partial fringe movement to obtain accuracy greater than would be obtained by relying only on the fringe count.

The remaining beam energy transmitted from retroreflector 310 passes through beam splitter 322 and is directed to a focusing lens 306 and then focused onto a dual axis lateral effect detector 308. Detector 308 may be, for example, a DL-4 detector manufactured by UDT Sensors Inc. Detector 308 is placed in the focal plane of focusing lens 306 which effectively performs the basic function of a dual-axis electronic autocollimator. Thus, detector 308 measures angular displacements (pitch and yaw) of housing 302 with respect to the incoming beam axis. Detector 308 is rendered relatively insensitive to lateral translations of housing 302 by virtue of the configuration of its light path, which includes focusing lens 306. Focusing lens 306 tends to focus input light across its width onto a single focal point. However, changes in the impact angle of light on focusing lens 306 (resulting from changes in pitch and yaw of the device with respect to the beam) shift the focal point, and this shift is measured by detector 308.

Detector 308 is located at the end of an elongated path created by mirrors 314, 316, and 318. This longer path increases sensitivity, and thus provides a substantial improvement in performance compared to previous versions of the same 5-D design. Adjustment screws 320 permit fine adjustment of the beam direction onto the center of angle detector 308 from the outside of housing 302.

Thus, by virtue of the interferometer and the two detectors 308 and 312, five angular and displacement measurements can be obtained simultaneously. The output of interferometer 103 is a signal in A-quad-B format, while detectors 308 and 312 provide four-pin outputs D1 and D2 respectively. The outputs of detectors 308 and 312 are processed by summing and difference amplifier circuits specified by the detector manufacturer, and the resulting signals are digitized and provided to computer 110 for storage, analysis, and display.

Figure 4:
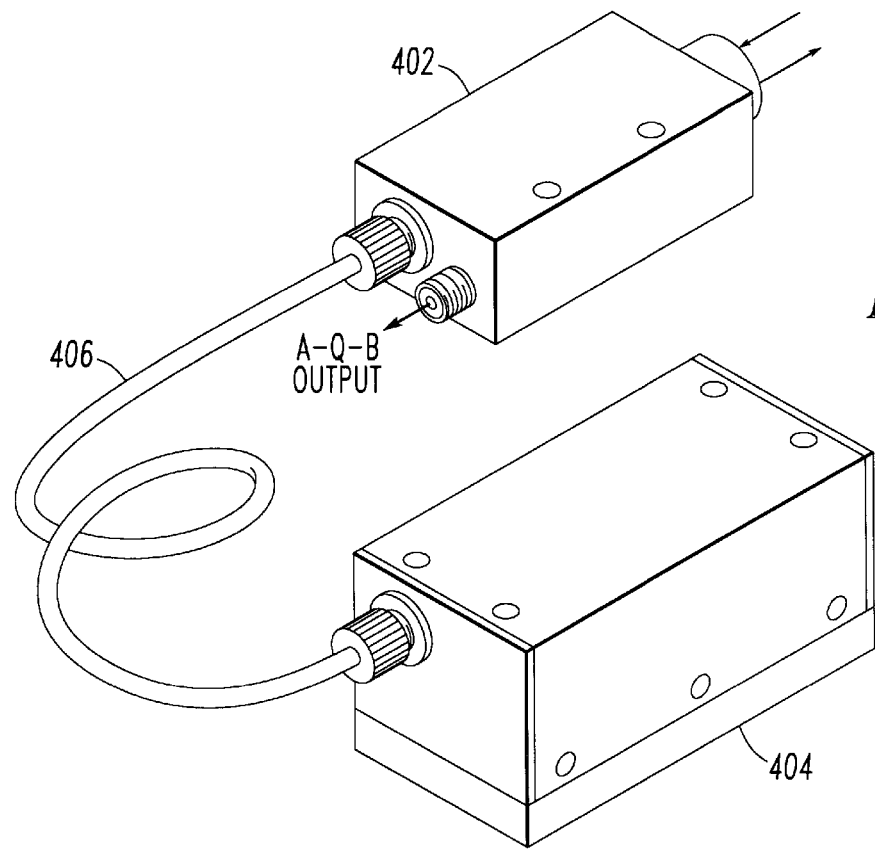
FIG. 4 is an assembly drawing of another preferred embodiment of the invention wherein laser head and interferometer units are provided in separate housings, connected by a polarization-maintaining fiber optic connection.

In another preferred embodiment of the invention, shown in FIG. 4, the laser 102 (shown in FIGS. 1 through 3) is separated into two discrete components, an interferometer head 402 containing the interferometer, receiver optics, sensors, and fringe-counting circuits, and a remote laser head 404 containing the frequency stabilized laser. Interferometer head 402 and laser head 404 are connected by a polarization maintaining (PM) fiber optic cable 406. In operation on a machine tool or other measurement application, remote laser head 404 may be placed in any convenient location, while interferometer head 402 is mounted in a secure, fixed location, typically on a machine tool table for machine tool performance evaluation applications.

This separation of the units provides several significant advantages. First, this embodiment moves the laser, which is a heat source, away from the precision detectors in the interferometer head, thus reducing temperature variation effects on the detectors, and increasing precision. Second, the size reduction in the interferometer head resulting from the removal of the laser makes it easier to install and align the interferometer head. Third, the inventors have discovered that the use of a PM fiber tends to reshape the laser beam and improve pointing stabilization of the beam, overcoming beam wandering. The length of the PM fiber is preferably at least several inches long to provide the desired improvement in stabilization of the beam by virtue of the polarizing features of the fiber. However, for practical use, the PM fiber may be about two meters long or longer, to make possible a variety of mounting positions for the laser unit in the area around the machine tool.

The outputs of the sensors of the five-axis system and the output of measurement sensor 105 are processed and connected to computer 110 using the circuits described above, and further shown in FIG. 5.

Figure 5:
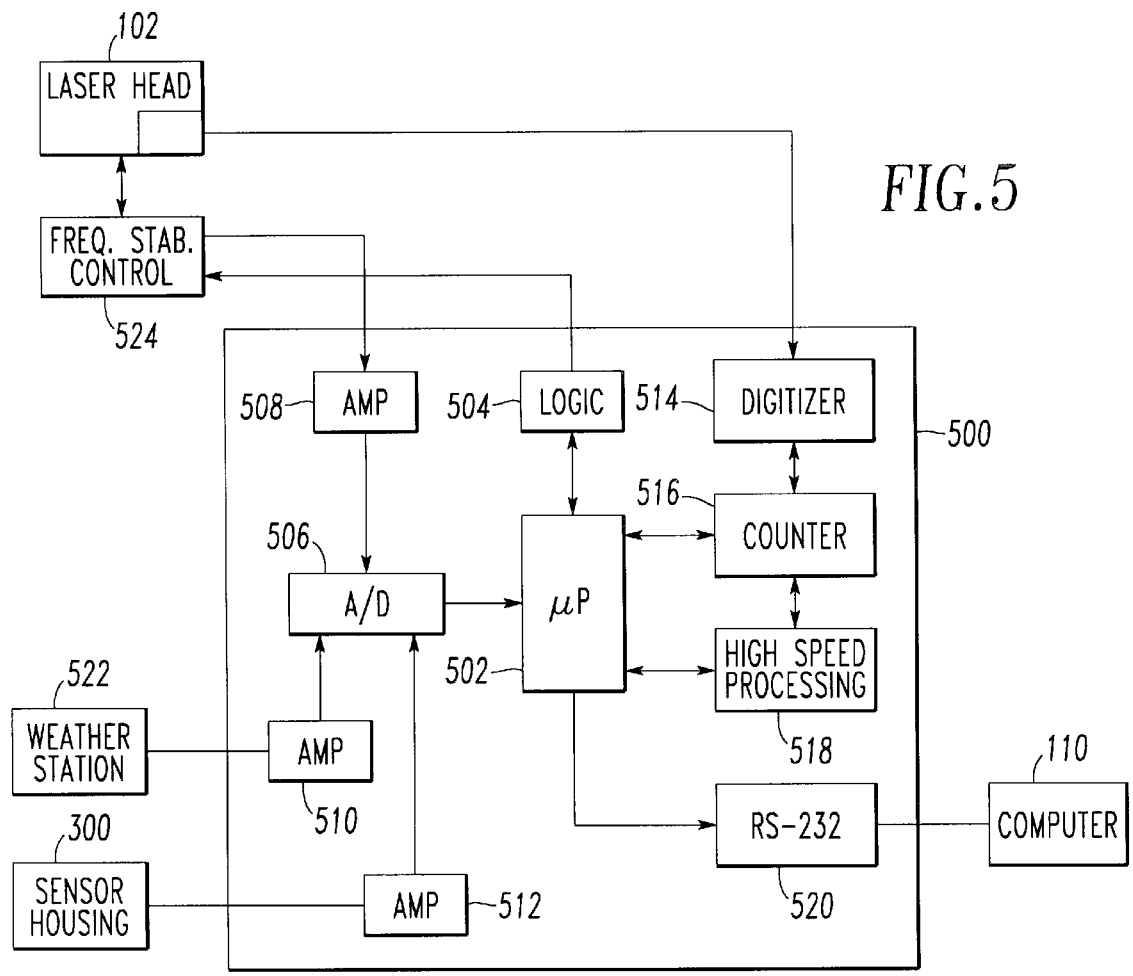
FIG. 5 is a block-schematic diagram of the detector output processing circuits used in the present invention.

FIG. 5 shows interface circuit 500 which is preferably connected between the laser head, housing 302, and computer 110. Interface circuit 500 provides signal processing and digitizing functions, and provides the resulting measurement data to computer 110 using an RS-232 interface. Interface circuit 500 comprises microcontroller 502, connecting logic 504, analog to digital converter 506, amplifiers 508, 510, and 512, digitizer 514, counter 516, high speed processing circuits 518, and RS-232 interface 520.

As shown in FIG. 5, a weather station 522 is connected through amplifier 510 to A/D converter 506. The weather station senses air pressure, air temperature, and material temperature in the area of interest and provides an analog output signal representing each of these quantities. Sensor housing 302 (and particularly detectors 308 and 312 shown in FIG. 3) are connected through amplifiers 512 to A/D converter 506. A frequency stabilization control 524 associated with laser 102 is connected to laser 102 and through amplifier 508 to A/D converter 506. A/D converter 506 provides a 14 bit high resolution multiplexed digital output to microcontroller 502 to indicate the status of analog signals from frequency stabilization control 524, weather station 522, and sensor housing 302. Logic 504 provides an interface from microcontroller 502 to frequency stabilization control 524 for purposes of feedback control.

Interferometer 103 is connected to digitizer 514 which receives signals from the interferometer and converts them to digital format before transmitting them to counter 516. If interferometer 103 provides output in A-quad-B digital format, digitizer 514 may be omitted and the interferometer output can be connected directly to counter 516. Counter 516 is connected to microcontroller 502 and provides an indication of the number of interference fringes which have been detected as a result of movement of the target relative to laser 102. Optionally, high speed processing circuits 518 may be provided if high speed movement is to be tracked.

Microcontroller 502 is connected through RS-232 interface 520 to computer 110. Microcontroller 502 controls interface circuit 500 to collect raw data from the weather station, position, and angle sensors, and transmit this data to computer 110 in digital form for appropriate compensation, analysis, and presentation.

Computer 110 is provided with software for receiving raw measurement data through an RS-232 interface (from interface circuit 500) and providing a user front end for system control, display of results, and analysis. Computer 110 performs temperature and pressure compensation functions on the raw data. Computer 110 also performs laser high accuracy subdivision on the interferometer output to interpolate between counted fringes. Finally, the software records final measurement output and displays results numerically and graphically for the convenience of the user.

The five-axis sensor is calibrated against a conventional laser interferometer to ensure system accuracy. A computer error mapping and compensation technique is implemented in computer 110 after all sensors are calibrated, to increase accuracy of the system.

Figure 6:
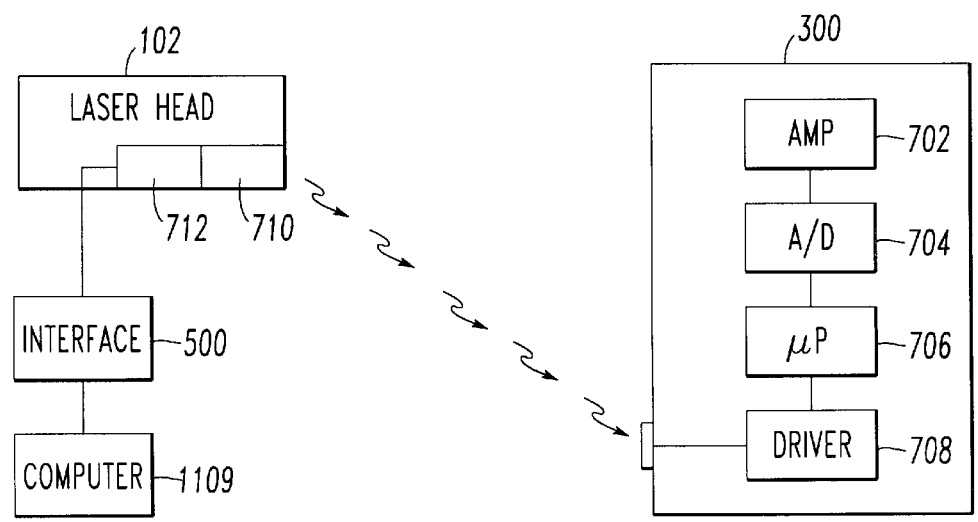
FIG. 6 is a block schematic diagram showing a wireless connection of the sensors in the on-tool housing.

FIG. 6 shows another embodiment of the invention wherein housing 302 is provided with a wireless transmitter, such as a radio or infrared transmitter, for transmitting sensor data to the system. In the preferred embodiment, housing 302 is provided with an amplifying circuit 702 connected to the outputs of detectors 308 and 312. Amplifying circuit 702 is connected to multiplexed analog-to-digital converter 704 which is connected to microcontroller 706. Microcontroller 706 receives digitized raw output from the sensors in housing 302 and transmits this information using, for example, infrared driver circuit 708. Circuits 702, 704, 706, and 708 in housing 302 are powered by a battery, preferably of a rechargeable type which is also located in housing 302.

The laser 102 (or, in the case of the embodiment of FIG. 4, interferometer head 402) is provided with an appropriate receiver 710 for the transmitted data. A microcontroller 712 connected to receiver 710 transmits the received data to the inputs of interface circuit 500 where the data is processed in the manner described previously. This embodiment provides a significant advantage, since it eliminates the wires that otherwise must connect housing 302 to the other equipment in the system. In machine tool applications, housing 302 is typically attached to a moving tool head. Thus, when wires are present, movement distances are limited by the length of the wires, and there is a potential for tangling or snagging the wires as the tool moves. The use of infrared or other wireless technology in place of these wires is a significant improvement.

Figure 7:
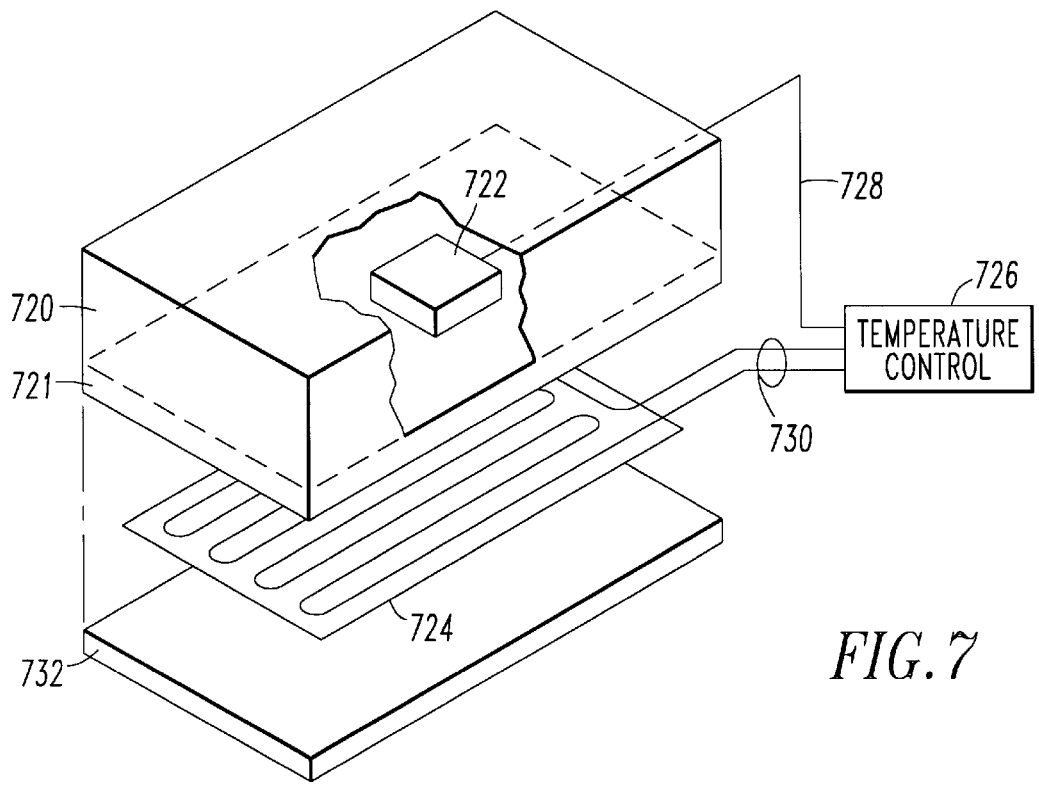
FIG. 7 is an assembly drawing showing components of a temperature-stabilized laser according to the present invention.

Referring now to FIG. 7, another feature of the present invention is illustrated wherein temperature stabilization of the laser unit is provided by a heating element and a feedback control system designed to maintain the laser unit housing at a targeted temperature above ambient temperature. The inventors have found that this arrangement contributes significantly to stable and predictable operation of the laser. This temperature stabilization mechanism shortens warmup time for the laser and eliminates environmental temperature fluctuations, thereby increasing the precision of the position measurements derived from the system.

As shown in FIG. 7, a laser unit housing 720 is provided to accommodate any of the stabilized beam laser units described above. For example, housing 720 may be provided to accommodate laser head 102 (described with reference to FIGS. 1, 2, 3, 5 or 6) or laser head 404 (shown in FIG. 4). Laser unit housing 720 may be of aluminum or another material which provides relatively uniform heat conductivity. Housing 720 has a ⅝" thick aluminum base 721.

A temperature sensor 722 and heating pad 724 are connected to a temperature controller 726 by wires 728 and 730, respectively. Heating pad 724 is preferably a resistive heating element constructed with resistive copper alloy wire mounted in a flexible adhesive tape. Heating pad 724 may be a Model No. HK5402R12.8L12B heating pad manufactured by Minko Co. of Minneapolis, Minn. The adhesive tape of heating pad 724 is affixed to a milled recess of approximately 2–3 mm depth in the bottom surface of base 721 of housing 720, to effectively conduct generated heat to housing 720. A cover 732 is attached to the bottom of housing 720 to protect heating pad 724. The heating pad 724 may have dimensions of approximately 50 mm×75 mm.

Temperature sensor 722 is preferably mounted on a top surface of base 721. Temperature sensor 722 detects the temperature inside laser unit housing 720. Temperature controller 726 is a feedback controller that selectively applies current to heating pad 724 to maintain a constant predetermined temperature at temperature sensor 722, using conventional feedback control techniques.

The targeted elevated temperature in housing 720 is determined based on the operating temperature range of the laser. This temperature is selected to maximize stability of the laser output.

The 5-D measurement design provided in the present invention provides significant advantages compared to prior art systems. The arrangement is considerably more compact, robust, versatile, sensitive, and economical than conventional systems. Typically, prior art systems required separate setups for linear, straightness, and angular measurements, but the present invention can make all these measurements with a single setup, saving up to 80% of setup time. The system can also be used to make 1-D (linear only) and 3-D (linear and two angular) measurements. The system is typically accurate to 0.1 ppm for linear measurements, ±/−0.1 arc sec. for angular measurements, and 0.2 micrometer accuracy for straightness measurements, although increased accuracy is possible using the design.

I claim:

1. A laser roll detection system comprising:

a laser which generates a laser beam;

polarizing means associated with the laser for polarizing the laser beam into at least a first and a second component; and a roll measurement sensor including:

polarization beamsplitting means for separating the first polarized beam component from the second polarized beam component;

first intensity sensing means for sensing an intensity of the first component of the beam and providing an intensity output;

second intensity sensing means for sensing an intensity of the second component of the beam and providing an intensity output; and differential amplifying means having positive and negative inputs connected to the outputs of the first and second intensity sensing means, respectively, for providing an output indicating a roll orientation of the roll measurement sensor relative to the laser and polarizing means.

2. The system of claim 1, wherein the polarization beamsplitting means includes a Glan-Thompson polarization beamsplitter.

3. The system of claim 1, wherein the polarizing means includes a Glan-Thompson prism polarizer.

4. The system of claim 1, wherein the first and second intensity sensing means include first and second photodiodes, respectively.

5. A multi-axis measuring system, comprising:

a laser producing a laser beam;

a polarizer arranged to polarize the laser beam;

a first beam splitter disposed within a housing and arranged to split the polarized laser beam into first and second components;

a first sensor which detects the first component and measures displacement in y and z dimensions between the housing and the laser;

a reflector for reflecting the second component back through the first beam splitter, the first beam splitter separating the second component into a reflected signal and a passing signal;

a second sensor which detects the passing signal of the second component and measures angular pitch and yaw displacement between the housing and the laser beam; and a third sensor which detects the reflected signal of the second component and measures displacement in an x dimension between the laser and the housing.

6. The system of claim 5, wherein the first and second sensors are dual axis lateral effect detectors.

7. The system of claim 5, wherein the third sensor is an interferometer associated with the laser.

8. The system of claim 7, wherein the interferometer includes a plurality of photodiodes and a circuit for generating an A-quad-B output.

9. The system of claim 5, further comprising a focusing lens between the reflector and the second sensor.

10. The system of claim 5, wherein the third sensor is contained in the laser.

11. The system of claim 5, wherein the third sensor and the laser are separated but connected by a polarization maintaining fiber optic cable.

12. The system of claim 5, further comprising a second beam splitter between the polarizer and the first beam splitter, the second beam splitter splitting a portion of the laser beam to a roll detector.

13. The system of claim 12, wherein the roll detector includes:

a polarization beam splitter for generating first and second polarized split beams;

first and second intensity detectors for measuring the intensity of the first and second polarized split beams, respectively; and a differential amplifier for outputting an indication of roll displacement.

14. The system of claim 5, further comprising:

a transmitter for transmitting measurement information over a wireless communication link; and a computer for receiving and processing the transmitted measurement information.

15. A method for determining the position of an object, comprising the steps of:

generating a polarized laser beam from a laser generator;

splitting the polarized laser beam into first and second components in a first beam splitter;

measuring object position in first and second dimensions by detecting the first component;

reflecting the second component through the first beam splitter to reflect a portion of the second component and pass a remaining portion of the second component;

measuring object position in a third dimension by detecting the reflected portion of the second component; and measuring object position in fourth and fifth dimensions by detecting the remaining portion of the second component.

16. The method of claim 15, further comprising the step of focusing the remaining portion of the second component prior to measuring object position in the fourth and fifth dimensions.

17. The method of claim 15, further comprising the steps of:

splitting the laser beam, in a second beam splitter, to generate a redirected portion of the laser beam; and measuring object position in a sixth dimension based on the redirected portion.

18. The method of claim 17, wherein the step of measuring object position in the sixth dimension is performed by:

splitting the redirected portion into first and second polarized portions;

measuring an intensity of each of the first and second polarized portions; and differentially amplifying the intensity of each of the first and second polarized portions.

19. The method of claim 15, wherein the step of measuring object position in the third dimension is performed by passing the reflected portion through the laser generator and a polarization maintaining fiber optic cable to an interferometer.

20. The method of claim 15, further comprising the step of transmitting object position measurement information over a wireless communication link to a computer for processing.

21. A method for detecting roll displacement, comprising the steps of:

generating, in a laser source, a laser beam polarized in at least two directions;

splitting, in a roll measurement sensor, the laser beam into first and second portions, each portion corresponding to a polarization direction;

sensing an intensity of each portion and providing first and second intensity outputs; and differentially amplifying the first and second intensity outputs to provide an output indicative of a roll displacement between the roll measurement sensor and the laser source.

22. The method of claim 21, wherein the step of splitting is performed by a Glan-Thompson polarization beamsplitter.

23. The method of claim 21, wherein the laser source includes a laser for generating the laser beam and a Glan-Thompson polarizing prism for polarizing the laser beam in the at least two directions.

24. The method of claim 21, wherein the step of sensing is performed by first and second photodiodes, each photodiode sensing one of the first and second portions.

* * * * *